United States Patent [19]

Swartz et al.

[11] Patent Number: 5,780,117

[45] Date of Patent: Jul. 14, 1998

[54] DUAL-CURE LATEX COMPOSITIONS

[75] Inventors: Andrew Joseph Swartz, Charlotte, N.C.; Kurt Arthur Wood, Abington, Pa.

[73] Assignee: Rohm and Haas Company, Philadelphia, Pa.

[21] Appl. No.: 806,893

[22] Filed: Feb. 25, 1997

Related U.S. Application Data

[60] Provisional application No. 60/012,281 Feb. 26, 1996 and provisional application No. 60/014,800 Mar. 26, 1996.

[51] Int. Cl.$^6$ .................. C08F 2/46; C08J 3/28; C08K 3/20
[52] U.S. Cl. .......... 427/493; 430/905; 430/910; 430/927; 522/110; 522/113; 523/406; 525/107; 525/529; 525/530; 525/531; 525/532
[58] Field of Search .............. 523/406; 430/905, 430/910, 927; 522/110, 113; 525/107, 529, 530, 531, 532; 427/493

[56] References Cited

U.S. PATENT DOCUMENTS

| | | | |
|---|---|---|---|
| 3,450,613 | 6/1969 | Steinberg, IV | 204/159 |
| 4,552,604 | 11/1985 | Green | 156/246 |
| 5,100,955 | 3/1992 | Pons et al. | 524/114 |
| 5,110,867 | 5/1992 | Schutyser et al. | 525/114 |
| 5,210,157 | 5/1993 | Schutyer et al. | 525/502 |
| 5,306,744 | 4/1994 | Wolfersberger et al. | 523/201 |
| 5,371,148 | 12/1994 | Taylor et al. | 525/293 |
| 5,637,380 | 6/1997 | Kaneko et al. | 428/204 |

FOREIGN PATENT DOCUMENTS

| | | |
|---|---|---|
| 2099860 | 7/1994 | Canada . |
| 0 403 170 A2 | 6/1990 | European Pat. Off. . |
| 0 493 317 A1 | 12/1991 | Germany . |
| 0 591 759 A2 | 9/1993 | Germany . |
| 95/00560 | 1/1995 | WIPO . |

OTHER PUBLICATIONS

*Beitrage–Gesprache–Berichte*, pp. 144–147 (Apr. 1993).

*Radiation Curing*, Science and Technology, Pappas, S.P., pp. 333–399.

*Isocyanate–Free 2–Component Systems Based on a Carboxyl–Epoxy*, Walz, G., Forschung und Entwicklung Polykondensate, pp. 429–449.

*Ullman's Encyclopedia of Industrial Chemistry*, Fifth Edition, vol. A9, 2.1.3, p. 556 (1987).

*Primary Examiner*—Randy Gulakowski
*Attorney, Agent, or Firm*—Sudhir G. Deshmukh

[57] ABSTRACT

Radiation-curable latex compositions having a secondary curing mechanism are disclosed. In these compositions, an anionically stabilized, water-borne dispersion of one or more radiation-curable resins is combined with a low molecular weight compound having at least two reactive functional groups, wherein one reactive functional group comprises an epoxy and the other reactive functional group comprises either an epoxy or a functionality capable of self-condensation after film formation. Also disclosed is a method for providing a cross-linked protective coating on a substrate, wherein a coating of the composition of the present invention is applied to the substrate, the coated substrate is exposed to actinic radiation to effect curing, and then the unexposed or underexposed portions of the coated substrate are allowed to cure at room temperature or greater.

10 Claims, No Drawings

DUAL-CURE LATEX COMPOSITIONS

This is a nonprovisional application of prior pending provisional applications Ser. Nos. 60/012,281, filed Feb. 26, 1996 and 60/014,800, filed Mar. 26, 1996.

BACKGROUND OF THE INVENTION

The present invention relates generally to latex compositions which are cured by exposure to actinic radiation. Such latex compositions are especially useful in wood and wood product coatings applications, as binders for inks and overprint varnishes, and as adhesives. The present invention relates particularly to such radiation-curable compositions having a secondary curing mechanism which is not dependent upon exposure to radiation.

The primary advantages to radiation-curable compositions are: speed of curing; stability; and the process control afforded to the user, especially in high speed, automated processes. These advantages are offset, however, by some significant disadvantages, most notably the inability of ultraviolet (UV) radiation to penetrate through the composition itself, and the inability to cure in unexposed or "shadow" regions. In either circumstance, the end result is a coating which is uncured, or undercured.

Others have attempted to overcome these disadvantages by, inter alia, providing secondary curing mechanisms which are not dependent upon exposure to actinic radiation. Such products are generally referred to as "dual cure" products. Examples of such secondary mechanisms include: heat-curing, using thermal initiators such as peroxides, azo compounds, and disulfides; anaerobic curing, wherein radical initiators (such as peroxides) which initiate slow polymerization reactions on exclusion of air; aerobic curing, using metal driers to initiate oxidative curing; and moisture-curing, using isocyanates or oxazolidines which react with ambient moisture to effect curing. These secondary curing mechanisms are reviewed by John G. Woods in Chapter 9 ("Radiation Curable Adhesives") of *Radiation Curing: Science and Technology*, Plenum Press:New York, 1992, pp. 333–398.

Reactions of epoxy groups with various non-epoxy functional groups, including carboxylic acids, have been used to attach pendant unsaturation to polymer chains to render them curable with actinic radiation; however, in such cases, high manufacturing temperatures are generally available to accelerate the epoxy reaction rate. The epoxy-acid reaction is very slow at ambient temperatures, and consequently, is not considered to be suitable for use as a secondary curing mechanism for most radiation-curable coatings and adhesives, since the heat sensitivity of the substrates employed prevents them from being cured at high temperatures. See, for example: *Ullmann's Encyclopedia of Industrial Chemistry*, Fifth ed., vol. A9, p. 556; see also data in G. Walz paper, in *Proceedings of XIth International conference in Organic Coatings Science and Technology* (8–12 Jul. 1985), Athens, Greece; p. 429ff.

STATEMENT OF THE INVENTION

One aspect of the present invention is directed to radiation-curable latex compositions having a secondary curing mechanism, comprising: an anionically stabilized, water-borne dispersion of one or more radiation-curable resins; and a low molecular weight compound having at least two reactive functional groups, wherein one reactive functional group comprises an epoxy and the other reactive functional group comprises either an epoxy or a functionality capable of self-condensation after film formation.

Another aspect of the present invention is directed to a method for providing a secondary curing mechanism to a radiation-curable latex composition, comprising the addition of a low molecular weight compound having at least two reactive functional groups, wherein one reactive functional group comprises an epoxy and the other reactive functional group comprises either an epoxy or a functionality capable of self-condensation after film formation.

A third aspect of the present invention includes a method for providing a cross-linked protective coating on a substrate, comprising the steps of: applying a coating of the composition of the present invention to the substrate; exposing the coated substrate to actinic radiation to effect curing; and allowing the unexposed or underexposed portions of the coated substrate to cure at room temperature or greater.

DETAILED DESCRIPTION OF THE INVENTION

As used in this specification, the following terms have the following definitions, unless the context clearly indicates otherwise. "Latex" or "latex composition" refers to a dispersion of a water-insoluble polymer which may be prepared by conventional polymerization techniques such as, for example, by emulsion polymerization, and "resin" refers to the polymer in the latex. "Crosslinkable" and "crosslinking" refer to the formation of new chemical bonds between existing polymer chains, and "curing" refers to the crosslinking of polymers after application to the substrate. "Storage-stable" refers to the ability of a latex composition or formulation to maintain its physical state and application characteristics, and give films with reproducible properties, during periods of prolonged storage in a storage container, prior to application to a substrate. "Pot life" or "shelf life" refers to the period of time a composition is storage-stable. "Two-pack" or "two-component" refers to coating compositions (or systems) with a relatively short pot life. In general, the components of two-component systems are stored separately, then are mixed together shortly before use. On the other hand, "one-pack" or "one-component" refers to coating compositions with a long shelf life, such that the components may be stored together in one container. Ranges specified are to be read as inclusive, unless specifically identified otherwise.

In the present invention, the resins of the present invention include but are not limited to: addition polymers of at least one ethylenically unsaturated monomer; condensation polymers made by the reaction of one or more diisocyanates or polyisocyanates with one or more compounds containing groups with active hydrogens; and polyester resins made by the reaction of one or more alcohols, especially diols or polyols, with polyhydric acids or anhydrides of polybasic acids. Such addition polymers include, for example, those prepared from acrylic ester monomers including methyl acrylate, ethyl acrylate, butyl acrylate, 2-ethylhexyl acrylate, methyl methacrylate, butyl methacrylate; styrene or substituted styrenes; butadiene; vinyl acetate or other vinyl esters; vinyl monomers such as vinyl chloride, vinylidene chloride, N-vinyl pyrrolidone; and acrylonitrile or methacrylonitrile. The condensation polymers include, for example, polyurethanes and polyureas such as those made by the reaction of one or more diisocyanates or polyisocyanates with one or more compounds containing groups with active hydrogens such as, for example, polyester, polycarbonate, or polyether di or polyols, monomeric alcohols, diols or polyols, primary or secondary amines or hydrazine compounds, mercaptans, or compounds containing enolic hydrogens such as acetoacetate groups; likewise included are polyester resins made by the reaction of one or more alcohols, especially diols or polyols, with polyhydric acids or anhydrides of polybasic acids, such as, for instance, reaction products of ethylene glycol, propylene glycol, the isomeric butanediols or hexanediols, glycerol, neopentylglycol, allyl alcohol, trimethylolpropane, diethylene glycol, triethylene glycol, dipropylene glycol, or polyether oligomers made by the condensation of one or more of these alcohols, with acids or acid anhydrides such as adipic acid, maleic acid, maleic anhydride, phthalic acid, phthalic anhydride, tetrahydrophthalic acid, tetrahydrophthalic anhydride, trimellitic anhydride, acrylic acid, methacrylic acid, fumaric acid, itaconic acid, or natural oil fatty acids such as linseed oil fatty acids, tall oil fatty acids, soybean oil fatty acids, or abietic acid. Polyester resins or their precursors may also be made by using transesterification reaction methods well known in the art for the production of alkyd polyesters.

Dispersions of these resins may be in the form of single or multi-staged particles. Multi-staged particles will comprise at least two mutually incompatible copolymers having any of a number of morphological configurations—for example: core/shell; core/shell particles with shell stages incompletely encapsulating the core; core/shell particles with a multiplicity of cores, interpenetrating network particles; and the like, where the greater portion of the surface area of the particles will be occupied by at least one outer stage, and the interior of the particle will be occupied by at least one inner stage.

For addition polymers included in the present invention, anionic stabilization may be conferred through the copolymerization of low levels of ethylenically-unsaturated acid monomers (e.g., 0.1–7%, by weight, based on the weight of the addition polymer). Examples of ethylenically unsaturated acid monomers useful in the present invention include but are not limited to those of: acrylic acid, methacrylic acid, crotonic acid, itaconic acid, fumaric acid, maleic acid, monomethyl itaconate, monomethyl fumarate, maleic anhydride, 2-acrylamido-2-methyl-1-propanesulfonic acid, sodium vinyl sulfonate, and phosphoethyl methacrylate.

For polyurethane condensation polymers included in the present invention, anionic stabilization may be conferred through the copolymerization of acid-containing compounds into the polymer backbone, such as, for example, 0.1–15 wt %, based on the weight of the polyurethane polymer, of dimethylolpropionic acid or of its sulfonic acid analogue. For polyester condensation polymers included in the present invention, anionic stabilization may be conferred through the use of a molar excess of acid functional groups during the polymerization of the resin, such that the resin has an acid equivalent weight between about 600 and 20,000 (for water-reducible resins, preferably between about 900 and 1400).

The polymers are rendered radiation-curable through the incorporation of ethylenically unsaturated groups, which may either be directly incorporated into the polymer backbone during its manufacture, or attached to the polymer backbone at some subsequent point. Examples of anionically stabilized, radiation-curable polymers useful in the present invention include but are not limited to those disclosed and described in: U.S. Pat. No. 4,287,039 (Buethe, et al.), DE 4,011,353 and DE 4,011,349 (Kressdorf et al.), DE 4,031,732 and DE 4,203,546 (Beck et al.), EP 399,160 (Flakus), EP 392,352 (Haberle et al.), EP 518,020 (Flakus), U.S. Pat. No. 5,306,744 (Wolfersberger et al.), U.S. Pat. No. 4,730,021 (Zom et al.), U.S. Pat. No. 4,107,013 (McGinniss, et al.), U.S. Pat. No. 5,371,148 (Taylor et al.), WO 95/00560 (Johnson et al.), and EP 442,653 (Pears, et al.). The contents of these patents and patent applications are hereby incorporated by reference herein.

Depending on the particular use, the resins useful in the present invention will generally be supplied as aqueous dispersions at solids levels between about 20 wt % and 70 wt %, or in water-reducible form (with or without a cosolvent) at solids levels between about 50 wt % and 100 wt %; The level of solids preferred for coatings applications depends upon the requirements of the particular application. For those applications where a low solids coating is preferred, it is preferred to use formulations between 5 wt % and 60 wt % of polymer solids, most preferably between about 20 wt % and 50 wt %. High solids coatings are preferably formulated at solids levels in excess of 60%, most preferably between 80 and 100 wt %.

The low molecular weight, epoxy-containing compounds of the present invention contain either: at least two epoxy functional groups (i.e. groups containing an oxirane ring); or at least one epoxy group and at least one other functional group capable of undergoing a condensation reaction with itself or with some reactive functionality on the resin backbone. The molecular weight of such compounds is preferably less than 1000, most preferably in the range of 100–500. Preferred epoxy-containing compounds include but are not limited to: aliphatic or cycloaliphatic di- and tri-epoxies such as 3,4-epoxycyclohexylmethyl-3,4-epoxycyclohexane carboxylate or bis-(3,4-epoxycyclohexyl) adipate; and epoxysilanes such as 3-glycidoxypropyltrimethyoxysilane or other glycidoxyalkyl trialkoxysilanes.

The epoxy compounds are added to the resin using methods known to those skilled in the art. For one-pack compositions, the simplest method is to add slowly an appropriate amount of the epoxy compound to the appropriate amount of resin under conditions of good distributive mixing, then to continue stirring for a period of time, typically 10 minutes to three hours. For two pack compositions, the epoxy compound may be added by the end user, under conditions of good distributive mixing, to a previously formulated paint, varnish or coating. In such cases, it may be preferable to let the epoxy-resin blend equilibrate several hours or overnight before application to the substrate. Potlifes obtainable with the compositions of the present invention may be several weeks.

Two pack compositions may also be mixed using plural component application equipment, in-line mixers, and so forth, using mixing and application methods which are well known in the art.

Typical use levels for epoxy compounds of the present invention are between 0.2–1.5 epoxy equivalents per resin acid equivalent, preferably between 0.5–1.0 epoxy equivalents per resin acid equivalent, depending on the epoxy, and the particular use for the resultant latex. The resin acid equivalent weights may be determined by a direct titration method such as that described in ASTM D4370-84, or alternatively, acid numbers supplied by manufacturers may be used. On a weight basis, epoxy compound levels may work out to be between about 0.5 and 10 wt %, based on the total weight of the polymer.

Surfactants are commonly used in emulsion or dispersion polymerization to provide stability, as well as to control particle size. Surfactants can also provide dispersibility for water-reducible resins. Conventional surfactants include anionic or nonionic emulsifiers or combinations thereof. Typical anionic emulsifiers include but are not limited to: alkali or ammonium alkyl sulfates, alkyl sulfonates, salts of fatty acids, esters of sulfosuccinic acid salts, alkyl diphenylether disulfonates, and salts or free acids of complex organic phosphate esters. Typical nonionic emulsifiers include but are not limited to: polyethers, e.g. ethylene oxide and propylene oxide condensates which include straight and branched chain alkyl and alkylaryl polyethylene glycol and polypropylene glycol ethers and thioethers, alkyl phenoxypoly(ethyleneoxy) ethanols having alkyl groups containing from about 7 to about 18 carbon atoms and having from about 4 to about 100 ethyleneoxy units, and polyoxy-alkylene derivatives of hexitol, including sorbitans, sorbides, mannitans, and mannides. Surfactants may be employed in the compositions of the present invention at levels of 0.1–3 wt % or greater, based on the total weight of the final composition.

Compositions of the present invention may contain photoinitiators, or combinations of photoinitiators and photoactivators, to promote the curing of the coating in those areas of the coating which are exposed to actinic radiation. Typical use levels for photoinitiators are 0.1–6 wt % based on non-volatile material, preferably about 0.5–4.0 wt %. Examples of such photoinitiators include benzophenone and substituted benzophenones, benzoin and its derivatives such as benzoin butyl ether and benzoin ethyl ether, benzil ketals such as benzil dimethyl ketal, acetophenone derivatives such as α,α-diethoxyacetophenone and α,α-dimethyl-α-hydroxyacetophenone, benzoates such as methyl-o-benzoyl benzoate, thioxanthones, Michler's ketone, and acylphosphine oxides or bis-acylphosphine oxides.

Other optional components of the compositions of the present invention include but are not limited to: co-solvents and coalescents, pigments, fillers, dispersants, wetting agents, anti-foam agents, UV absorbers, antioxidants, biocides, and stabilizers. These optional components (as desired) may be added in any order of addition which does not cause an incompatibility between components. Components which do not dissolve in the aqueous carrier (such as pigments and fillers) can be dispersed in the latex or an aqueous carrier or co-solvent using a high shear mixer. The pH of the composition can be adjusted by adding acid or base, with agitation. Examples of base include but are not limited to ammonia, diethylamine, triethylamine, dimethylethanolamine, triethanolamine, sodium hydroxide, potassium hydroxide, and sodium acetate. Examples of acids include but are not limited to acetic acid, formic acid, hydrochloric acid, nitric acid, and toluene sulfonic acid.

The formulated coating compositions may be used as top coats, intermediate coats, or primer coats, and are useful as: paints, including wood lacquers; stains; varnishes; adhesives; inks, including screen printing inks and gravure and flexographic printing inks; plastics, including plastic sheeting and polyvinylchloride flooring; fiber; paper, including overprint varnishes for paper and board; leather; and solder mask photoresists on electronic circuits, printing plates, and other composites using ultraviolet curing. These coatings are particularly useful in wood applications, such as for example, on cabinets, furniture, and flooring.

The compositions of the present invention can be applied to desired substrates using conventional application techniques such as conventional or airless spray, roll, brush, curtain, flood, bell, disc, and dip-coating methods. Once applied to the substrate, the compositions are cured by exposure to radiation after most or all of the water has evaporated from the composition. Useful forms of radiation include ionizing radiation, electron beam radiation, and ultraviolet radiation. Sources of ultraviolet radiation include sunlight, mercury vapor lamps, carbon-arc lamps, xenon lamps, and the like. It is preferred to use mercury vapor lamps.

The following examples are presented to illustrate further various aspects of the present invention, but are not intended to limit the scope of the invention in any respect. In Examples 1 and 2, below, mar resistance and spot resistance tests were conducted on various latexes, with and without the secondary curing mechanisms of the present invention, for comparison purposes. The test methods and the formulations for the latex controls used in these Examples are described below.

Mar Resistance Test—The film is struck vigorously with the back of the fingernail several times, then rated according to the mark left on the film. Spots were rated visually on a 0–10 scale, where 10 indicates no trace left on the film.

Spot Resistance Test—Covered spot tests were performed according to ASTM D1308-87. Spots were rated visually after recovery using a 0–10 scale, where 0=complete destruction of the coating, and 10=no effect of test solution.

Latex A is a radiation-curable acrylic latex, formed by making a two stage polymer of overall composition 48 wt % butyl acrylate, 24 wt % styrene, 25.5 wt % methacrylic acid, and 2.5% allyl methacrylate, neutralizing 15% of the acid equivalents with ammonium hydroxide, adding an amount of glycidyl methacrylate corresponding to 74 mole percent of the acid, and reacting at about 80° C. until essentially all the glycidyl methacrylate has reacted. The resulting latex had a solids content of 40.2% by weight, a methacrylate equivalent weight of 592 based on dry polymer (for UV curing), and an acid number of 58 based on dry polymer.

Latex B, for purposes of comparison, is a non-radiation-curable latex, formed by preparing a single stage polymer of butyl acrylate and methyl methacrylate, with a glass transition temperature of 55° C. The resulting latex had a solids content of 37% by weight, no residual methacrylate functionality, and an acid number of 52 based on dry polymer. It was neutralized with ammonia to pH 7.0 and formulated according to the following table.

| INGREDIENT | Amount (wt %) |
| --- | --- |
| Latex B | 202.7 |
| Ethylene glycol monobutyl ether | 9.75 |
| Ethylene glycol ethylhexyl ether | 1.50 |
| Isopropanol | 11.25 |
| Water | 63.1 |
| 7% Ammonia solution | 20.0 |

Example 1

Latex With Epoxysilane

For this example, 3-glycidyoxypropyltrimethoxysilane ("GPMS") was added to Latex A, at levels of 25% and 50% equivalents (2.3 wt % and 4.5 wt % respectively, based on the weight of the wet Latex A). Solids were kept constant at 40% by addition of water, as necessary. The epoxysilane stirred in readily, without any apparent shock to the latex. The adduct preparations remained fluid, without sludge or apparent viscosity buildup, for at least several weeks. When the formulations were 7 days old, they were applied to cherry veneer using a draw down bar (two coats). Latex A alone (without photoinitiator) and Latex B (not a radiation-curable thermoplastic formulation) were also applied, as controls. The films were then aged 3 days at 60° C. in order to simulate an extended room temperature cure. The films were then tested, and gave the following results.

|  | Latex A Alone | Latex A + 0.25 eq GPMS | Latex A + 0.5 eq GPMS | Latex B |
|---|---|---|---|---|
| 16 hour spot test: | | | | |
| Water | 9 | 9 | 10 | 10 |
| 1% Dreft detergent | 5 | 8 | 8 | 7 |
| Vinegar | 9 | 10 | 10 | 9 |
| 1 hour spot test: | | | | |
| 50% EtOH | 8 | 9 | 10 | 4 |
| 3A EtOH | 1 | 7 | 8 | 0 |
| 7% Ammonia | 1 | 3 | 4 | 1 |
| Mar Resistance | 6 | 6 | 9 | 4 |

While the Latex A alone performed well after the three day accelerated cure, the boost from the epoxysilane was quite evident. With the addition of the epoxysilane, the Latex A films surpassed the Latex B film by a wide margin in base resistance, alcohol resistance, and near resistance.

Example 2
Latex With Diepoxy

For this example, an aliphatic diepoxy (3,4-epoxycyclohexylmethyl-3,4-cyclohexylcarboxylate) was stirred into Latex A. Formulations at 50% and 100% equivalents (2.7 wt % and 5.3 wt % respectively, based on the weight of the wet Latex A) were prepared. Solids were kept constant at 40% by addition of water, as necessary. The diepoxy stirred in readily, without any apparent shock to the latex. The adduct preparations remained fluid, without sludge or apparent viscosity buildup, for at least several weeks. When the formulations were 24 hours old, they were applied to cherry veneer using a draw down bar (two coats). The same controls as for Example 1 were used in this Example. The films were aged 3 days at 60° C. in order to simulate an extended room temperature cure. The films were then tested, and gave the following results.

|  | Latex A Alone | Latex A + 0.5 eq Diepoxy | Latex A + 1.0 eq Diepoxy | Latex B |
|---|---|---|---|---|
| 16 hour spot test: | | | | |
| Water | 10 | 10 | 10 | 10 |
| 1% Dreft detergent | 5 | 9 | 10 | 5 |
| Vinegar | 8 | 10 | 10 | 9 |
| 1 hour spot test: | | | | |
| 50% EtOH | 7 | 9 | 10 | 2 |
| 3A EtOH | 1 | 7 | 8–9 | 0 |
| 7% Ammonia | 0 | 6 | 9 | 1 |

As with Example 1, Latex A alone performed well; however, the addition of the diepoxy considerably boosted its performance, to levels far surpassing that achieved from the Latex B film.

We claim:

1. A radiation-cured latex composition having a secondary curing mechanism, comprising:

an anionically stabilized, water-borne dispersion of one or more radiation-curable resins; and a low molecular weight compound having at least two reactive functional groups, wherein one reactive functional group comprises an epoxy and the other reactive functional group comprises either an epoxy or a functionality, which is cured via self-condensation after film formation.

2. The latex composition of claim 1, wherein the low molecular weight compound having at least two reactive functional groups is selected from the group consisting of: aliphatic or cycloaliphatic di- and tri-epoxies, and epoxysilanes.

3. The latex composition of claim 2, wherein the low molecular weight compound having at least two reactive functional groups is selected from the group consisting of: 3,4-epoxycyclohexylmethyl-3,4-epoxycyclohexane carboxylate, bis-(3,4-epoxycyclohexyl) adipate, 3-glycidoxypropyltrimethyoxy silane, and other glycidoxyalkyl trialkoxysilanes.

4. The latex composition of claim 1, wherein the molecular weight of the low molecular weight compound is less than 1000.

5. The latex composition of claim 4, wherein the molecular weight of the low molecular weight compound is between 100–500.

6. The latex composition of claim 1, wherein the composition has a pot life of at least 2 weeks.

7. A method for providing a cross-linked protective coating on a substrate, comprising the steps of: applying a coating of the composition of claim 1 to the substrate; exposing the coated substrate to actinic radiation to effect curing; and allowing the unexposed or underexposed portions of the coated substrate to cure at room temperature or greater.

8. A method for providing a secondary curing mechanism to a radiation-cured latex composition, comprising the addition of a low molecular weight compound having at least two reactive functional groups, wherein one reactive functional group comprises an epoxy and the other reactive functional group comprises either an epoxy or a functionality, which is cured via self-condensation after film formation.

9. The method of claim 8, wherein the low molecular weight compound having at least two reactive functional groups is selected from the group consisting of: aliphatic or cycloaliphatic di- and tri-epoxies, and epoxysilanes.

10. The method of claim 9, wherein the low molecular weight compound having at least two reactive functional groups is selected from the group consisting of: 3,4-epoxycyclohexylmethyl-3,4-epoxycyclohexane carboxylate, bis-(3,4-epoxycyclohexyl) adipate, 3-glycidoxypropyltrimethyoxysilane, and other glycidoxyalkyl trialkoxysilanes.

* * * * *